(12) United States Patent
Wolff

(10) Patent No.: US 6,684,402 B1
(45) Date of Patent: Jan. 27, 2004

(54) CONTROL METHODS AND APPARATUS FOR COUPLING MULTIPLE IMAGE ACQUISITION DEVICES TO A DIGITAL DATA PROCESSOR

(75) Inventor: Robert Wolff, Sherborn, MA (US)

(73) Assignee: Cognex Technology and Investment Corporation, Mountain View, CA (US)

(*) Notice: Subject to any disclaimer, the term of this patent is extended or adjusted under 35 U.S.C. 154(b) by 0 days.

(21) Appl. No.: 09/452,612

(22) Filed: Dec. 1, 1999

(51) Int. Cl.⁷ .................................. H04N 7/173
(52) U.S. Cl. .................. 725/105; 348/212; 370/402; 395/290
(58) Field of Search .................. 348/212; 370/402; 700/19; 713/324; 395/290; 725/105

(56) References Cited

U.S. PATENT DOCUMENTS

| | | |
|---|---|---|
| 3,816,722 A | 6/1974 | Sakoe et al. |
| 3,936,800 A | 2/1976 | Ejiri et al. |
| 3,967,100 A | 6/1976 | Shimomura |
| 3,968,475 A | 7/1976 | McMahon |
| 3,978,326 A | 8/1976 | Shimomura |
| 4,011,403 A | 3/1977 | Epstein et al. |
| 4,115,702 A | 9/1978 | Nopper |
| 4,115,762 A | 9/1978 | Akiyama et al. |
| 4,183,013 A | 1/1980 | Agrawala et al. |
| 4,200,861 A | 4/1980 | Hubach et al. |
| 4,254,400 A | 3/1981 | Yoda et al. |
| 4,286,293 A | 8/1981 | Jablonowski |
| 4,300,164 A | 11/1981 | Sacks |
| 4,385,322 A | 5/1983 | Hubach et al. |
| 4,435,837 A | 3/1984 | Abernathy |
| 4,441,124 A | 4/1984 | Heebner et al. |
| 4,441,206 A | 4/1984 | Kuniyoshi et al. |
| 4,519,041 A | 5/1985 | Fant et al. |
| 4,534,813 A | 8/1985 | Williamson et al. |
| 4,541,116 A | 9/1985 | Lougheed |
| 4,570,180 A | 2/1986 | Baier et al. |
| 4,577,344 A | 3/1986 | Warren et al. |
| 4,581,762 A | 4/1986 | Lapidus et al. |
| 4,606,065 A | 8/1986 | Beg et al. |
| 4,617,619 A | 10/1986 | Gehly |
| 4,630,306 A | 12/1986 | West et al. |
| 4,641,349 A | 2/1987 | Flom et al. |
| 4,688,088 A | 8/1987 | Hamazaki et al. |
| 4,706,168 A | 11/1987 | Weisner |
| 4,707,647 A | 11/1987 | Coldren et al. |
| 4,728,195 A | 3/1988 | Silver |

(List continued on next page.)

FOREIGN PATENT DOCUMENTS

| | | |
|---|---|---|
| EP | 0 527 632 A2 | 2/1993 |
| EP | 0 777 381 A2 | 11/1996 |
| WO | WO 95/21376 | 8/1995 |

(List continued on next page.)

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

(List continued on next page.)

*Primary Examiner*—Andy Rao
*Assistant Examiner*—Charles E Parsons
(74) *Attorney, Agent, or Firm*—David J. Powsner

(57) ABSTRACT

A hub that controls the acquisition of images from a plurality of image sources utilizes image acquisition logic that selectively applies a first set of control signals (e.g., "shutter" signals) to imaging devices, causing them to acquire images. The logic applies a second set of control signals (e.g., "readout" signals) to the devices, causing them to output the images to the hub. Those images are transferred by the hub to a host over an isochronous communications medium.

38 Claims, 2 Drawing Sheets

U.S. PATENT DOCUMENTS

| | | |
|---|---|---|
| 4,730,260 A | 3/1988 | Mori et al. |
| 4,731,858 A | 3/1988 | Grasmueller et al. |
| 4,736,437 A | 4/1988 | Sacks et al. |
| 4,742,551 A | 5/1988 | Deering |
| 4,752,898 A | 6/1988 | Koenig |
| 4,758,782 A | 7/1988 | Kobayashi |
| 4,764,870 A | 8/1988 | Haskin |
| 4,771,469 A | 9/1988 | Wittenburg |
| 4,776,027 A | 10/1988 | Hisano et al. |
| 4,782,238 A | 11/1988 | Radl et al. |
| 4,783,826 A | 11/1988 | Koso |
| 4,783,828 A | 11/1988 | Sadjadi |
| 4,783,829 A | 11/1988 | Miyakawa et al. |
| 4,809,077 A | 2/1989 | Norita et al. |
| 4,831,580 A | 5/1989 | Yamada |
| 4,860,374 A | 8/1989 | Murakami et al. |
| 4,860,375 A | 8/1989 | McCubbrey et al. |
| 4,876,457 A | 10/1989 | Bose |
| 4,876,728 A | 10/1989 | Roth |
| 4,891,767 A | 1/1990 | Rzasa et al. |
| 4,903,218 A | 2/1990 | Longo et al. |
| 4,907,169 A | 3/1990 | Lovoi |
| 4,912,559 A | 3/1990 | Ariyoshi et al. |
| 4,914,553 A | 4/1990 | Hamada et al. |
| 4,922,543 A | 5/1990 | Ahlbom et al. |
| 4,926,492 A | 5/1990 | Tanaka et al. |
| 4,932,065 A | 6/1990 | Feldgajer |
| 4,953,224 A | 8/1990 | Ichinose et al. |
| 4,955,062 A | 9/1990 | Terui |
| 4,959,898 A | 10/1990 | Landman et al. |
| 4,962,423 A | 10/1990 | Yamada et al. |
| 4,972,359 A | 11/1990 | Silver et al. |
| 4,982,438 A | 1/1991 | Usami et al. |
| 5,012,402 A | 4/1991 | Akiyama |
| 5,012,524 A | 4/1991 | LeBeau |
| 5,027,419 A | 6/1991 | Davis |
| 5,046,190 A | 9/1991 | Daniel et al. |
| 5,054,096 A | 10/1991 | Beizer |
| 5,060,276 A | 10/1991 | Morris et al. |
| 5,063,608 A | 11/1991 | Siegel |
| 5,073,958 A | 12/1991 | Imme |
| 5,081,656 A | 1/1992 | Baker et al. |
| 5,081,689 A | 1/1992 | Meyer et al. |
| 5,086,478 A | 2/1992 | Kelly-Mahaffey et al. |
| 5,090,576 A | 2/1992 | Menten |
| 5,091,861 A | 2/1992 | Geller et al. |
| 5,091,968 A | 2/1992 | Higgins et al. |
| 5,093,867 A | 3/1992 | Hori et al. |
| 5,113,565 A | 5/1992 | Cipolla et al. |
| 5,115,309 A | 5/1992 | Hang |
| 5,119,435 A | 6/1992 | Berkin |
| 5,124,622 A | 6/1992 | Kawamura et al. |
| 5,133,022 A | 7/1992 | Weideman |
| 5,134,575 A | 7/1992 | Takagi |
| 5,143,436 A | 9/1992 | Baylor et al. |
| 5,145,432 A | 9/1992 | Midland et al. |
| 5,151,951 A | 9/1992 | Ueda et al. |
| 5,153,925 A | 10/1992 | Tanioka et al. |
| 5,155,775 A | 10/1992 | Brown |
| 5,159,281 A | 10/1992 | Hedstrom et al. |
| 5,159,645 A | 10/1992 | Kumagai |
| 5,164,994 A | 11/1992 | Bushroe |
| 5,168,269 A | 12/1992 | Harlan |
| 5,179,419 A | 1/1993 | Palmquist et al. |
| 5,185,810 A | 2/1993 | Freischlad |
| 5,185,855 A | 2/1993 | Kato et al. |
| 5,189,712 A | 2/1993 | Kajiwara et al. |
| 5,206,820 A | 4/1993 | Ammann et al. |
| 5,216,503 A | 6/1993 | Paik et al. |
| 5,225,940 A | 7/1993 | Ishii et al. |
| 5,230,027 A | 7/1993 | Kikuchi |
| 5,243,607 A | 9/1993 | Masson et al. |
| 5,253,306 A | 10/1993 | Nishio |
| 5,253,308 A | 10/1993 | Johnson |
| 5,265,173 A | 11/1993 | Griffin et al. |
| 5,271,068 A | 12/1993 | Ueda et al. |
| 5,287,449 A | 2/1994 | Kojima |
| 5,297,238 A | 3/1994 | Wang et al. |
| 5,297,256 A | 3/1994 | Wolstenholme et al. |
| 5,299,269 A | 3/1994 | Gaborski et al. |
| 5,307,419 A | 4/1994 | Tsujino et al. |
| 5,311,598 A | 5/1994 | Bose et al. |
| 5,315,388 A | 5/1994 | Shen et al. |
| 5,319,457 A | 6/1994 | Nakahashi et al. |
| 5,327,156 A | 7/1994 | Masukane et al. |
| 5,329,469 A | 7/1994 | Watanabe |
| 5,337,262 A | 8/1994 | Luthi et al. |
| 5,337,267 A | 8/1994 | Colavin |
| 5,363,507 A | 11/1994 | Nakayama et al. |
| 5,367,439 A | 11/1994 | Mayer et al. |
| 5,367,667 A | 11/1994 | Wahlquist et al. |
| 5,371,690 A | 12/1994 | Engel et al. |
| 5,388,197 A | 2/1995 | Rayner |
| 5,388,252 A | 2/1995 | Dreste et al. |
| 5,398,292 A | 3/1995 | Aoyama |
| 5,432,525 A | 7/1995 | Maruo et al. |
| 5,440,699 A | 8/1995 | Farrand et al. |
| 5,455,870 A | 10/1995 | Sepai et al. |
| 5,455,933 A | 10/1995 | Schieve et al. |
| 5,471,312 A | 11/1995 | Watanabe et al. |
| 5,475,766 A | 12/1995 | Tsuchiya et al. |
| 5,477,138 A | 12/1995 | Efjavic et al. |
| 5,481,712 A | 1/1996 | Silver et al. |
| 5,485,570 A | 1/1996 | Bushboom et al. |
| 5,491,780 A | 2/1996 | Fyles et al. |
| 5,495,424 A | 2/1996 | Tokura |
| 5,495,537 A | 2/1996 | Bedrosian et al. |
| 5,500,906 A | 3/1996 | Picard et al. |
| 5,506,617 A | 4/1996 | Parulski et al. |
| 5,506,682 A | 4/1996 | Pryor |
| 5,511,015 A | 4/1996 | Flockencier |
| 5,519,840 A | 5/1996 | Matias et al. |
| 5,526,050 A | 6/1996 | King et al. |
| 5,528,703 A | 6/1996 | Lee |
| 5,532,739 A | 7/1996 | Garakani et al. |
| 5,539,409 A | 7/1996 | Mathews et al. |
| 5,544,256 A | 8/1996 | Brecher et al. |
| 5,548,326 A | 8/1996 | Michael |
| 5,550,763 A | 8/1996 | Michael |
| 5,553,859 A | 9/1996 | Kelly et al. |
| 5,557,410 A | 9/1996 | Huber et al. |
| 5,557,690 A | 9/1996 | O'Gorman et al. |
| 5,566,877 A | 10/1996 | McCormack |
| 5,568,563 A | 10/1996 | Tanaka et al. |
| 5,574,668 A | 11/1996 | Beaty |
| 5,574,801 A | 11/1996 | Collet-Beillon |
| 5,581,632 A | 12/1996 | Koljonen et al. |
| 5,583,949 A | 12/1996 | Smith et al. |
| 5,583,954 A | 12/1996 | Garakani |
| 5,586,058 A | 12/1996 | Aloni et al. |
| 5,592,562 A | 1/1997 | Rooks |
| 5,594,859 A | 1/1997 | Palmer et al. |
| 5,602,937 A | 2/1997 | Bedrosian et al. |
| 5,608,490 A | 3/1997 | Ogawa |
| 5,608,872 A | 3/1997 | Schwartz et al. |
| 5,640,199 A | 6/1997 | Garakani et al. |
| 5,640,200 A | 6/1997 | Michael |
| 5,642,158 A | 6/1997 | Petry, III et al. |
| 5,647,009 A | 7/1997 | Aoki et al. |

| | | | |
|---|---|---|---|
| 5,657,403 A | 8/1997 | Wolff et al. | |
| 5,673,334 A | 9/1997 | Nichani et al. | |
| 5,676,302 A | 10/1997 | Petry, III | |
| 5,696,848 A | 12/1997 | Patti et al. | |
| 5,715,369 A | 2/1998 | Spoltman et al. | |
| 5,717,785 A | 2/1998 | Silver | |
| 5,724,439 A | 3/1998 | Mizuoka et al. | |
| 5,742,037 A | 4/1998 | Scola et al. | |
| 5,751,853 A | 5/1998 | Michael | |
| 5,754,679 A | 5/1998 | Koljonen et al. | |
| 5,757,956 A | 5/1998 | Koljonen et al. | |
| 5,761,326 A | 6/1998 | Brady et al. | |
| 5,768,443 A | 6/1998 | Michael et al. | |
| 5,784,581 A * | 7/1998 | Hannah | 395/290 |
| 5,793,899 A | 8/1998 | Wolff et al. | |
| 5,796,386 A | 8/1998 | Lipscomb et al. | |
| 5,796,868 A | 8/1998 | Dutta-Choudhury | |
| 5,801,966 A | 9/1998 | Ohashi | |
| 5,805,722 A | 9/1998 | Cullen et al. | |
| 5,809,658 A | 9/1998 | Jackson et al. | |
| 5,818,443 A | 10/1998 | Schott | |
| 5,825,483 A | 10/1998 | Michael et al. | |
| 5,825,913 A | 10/1998 | Rostami et al. | |
| 5,835,622 A | 11/1998 | Koljonen et al. | |
| 5,845,007 A | 12/1998 | Ohashi et al. | |
| 5,848,189 A | 12/1998 | Pearson et al. | |
| 5,850,466 A | 12/1998 | Schott | |
| 5,859,923 A | 1/1999 | Petry, III et al. | |
| 5,861,909 A | 1/1999 | Garakani et al. | |
| 5,872,870 A | 2/1999 | Michael | |
| 5,878,152 A | 3/1999 | Sussman | |
| 5,900,975 A | 5/1999 | Sussman | |
| 5,901,241 A | 5/1999 | Koljonen et al. | |
| 5,909,504 A | 6/1999 | Whitman | |
| 5,912,768 A | 6/1999 | Sissom et al. | |
| 5,912,984 A | 6/1999 | Michael et al. | |
| 5,918,196 A | 6/1999 | Jacobson | |
| 5,933,523 A | 8/1999 | Drisko et al. | |
| 5,943,441 A | 8/1999 | Michael | |
| 6,084,631 A * | 7/2000 | Tonkin et al. | 348/212 |
| 6,105,143 A * | 8/2000 | Kim | 713/324 |
| 6,356,793 B1 * | 3/2002 | Martin | 700/19 |
| 6,389,029 B1 * | 5/2002 | McAlear | 370/402 |

FOREIGN PATENT DOCUMENTS

| | | |
|---|---|---|
| WO | WO 95/22137 | 8/1995 |
| WO | WO 97/21189 | 6/1997 |
| WO | WO 97/22858 | 6/1997 |
| WO | WO 97/24692 | 7/1997 |
| WO | WO 97/24693 | 7/1997 |
| WO | WO 98/52349 | 11/1998 |
| WO | WO 98/59490 | 12/1998 |
| WO | WO 99/15864 | 4/1999 |

OTHER PUBLICATIONS

Teitelbaum et al. (19810 The Cornell Program Synthesizer: A Syntax–Directed Programming Environment, Communications of the ACM 24:563–573.

Newsletter from Acquity Imaging, Inc., "Remote Vision Support Package —The Phones Are Ringing!," 1 page.

PictureTel Corporation Product Brochure "PictureTel Live PCS 100(tm) Personal Visual Communications System," 3 pp. (1993).

PictureTel Corporation Product Brochure "PictureTel System 1000: Complete Videoconferencing for Cost Sensitive Applications," 4 pp. (1993).

PictureTel Corporation Product Brochure, "PictureTel System 4000(tm) A Family of Models to Fit Your Applications from Offices to Boardrooms, Classrooms, and Auditorium," 4 pp. (1993).

Symantec Corporation, "The Norton pcAnywhere User's Guide," Table of Contents 8 pp; Introduction of pcAnywhere Technology pp i–vii; Chapter 7 —Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Information, May 1986, Publication No. PS2067, May 1986, pp. 1–5.

NEC Electronics Inc., PD7281 Image Pipelined Processor, Product Information Brochure, pp. 2–169–2–211.

Horn, Berthold Klaus Paul. "Robot Vision", The Massachusetts Institute for Technology, 1986.

Racca Roberto G., Stephenson Owen, and Clements Reginald M. High–speed video analysis system using multiple shuttered charge–coupled device imagers and digital storage. Optical Engineering (Jun. 1992) 31;6.

Gevorkian David Z., Astola Jaakko T., and Atourian Samvel M. "Improving Gil–Werman Algorithm for Running Min and Max Filters" IEEE Transactions on Pattern Analysis and Machine Intelligence, vol. 19, No. 5, May 1997, pp. 526–529.

Gil, Joseph and Werman Michael. "Computing 2–D Min, Median, and Max Filters" IEEE Transactions on Pattern Analysis and Machine Intelligence, vol. 15, No. 5, May 1993, pp. 504–507.

Chapter 3: "Guidelines for Developing MMX Code," Intel.

Chapter 4: "MMX Code Development Strategy," Intel.

Chapter 5: "MMX Coding Techniques," Intel.

Chapter 3: "Optimization Techniques for Integer Blended Code," Intel.

Rosenfeld, Azriel. "Computer Vision: Basic Principles,"Proceedings of the IEEE. vol. 76, No. 8, Aug. 1988. pp. 863–868.

* cited by examiner

CONTROL METHODS AND APPARATUS FOR COUPLING MULTIPLE IMAGE ACQUISITION DEVICES TO A DIGITAL DATA PROCESSOR

BACKGROUND OF THE INVENTION

The invention pertains to image acquisition and, particularly, to the acquisition of image data from multiple sources. The invention has application in acquiring images from video cameras and other acquisition devices used in machine vision and in other industrial, research and recreational environments.

It is increasingly common to couple video cameras, and other image acquisition devices, to computers. This has been made possible by increases in computer processing power and storage capacity, as well as by decreases in equipment costs. It is also a consequence of the rise in popularity of the Internet, for which the transmission and display of images is increasingly norm.

Cameras and computers have long been used together in machine vision, which involves the automated analysis of images, typically, to determine characteristics of objects shown in them. It is often employed in automated manufacturing lines, where images of components are analyzed to determine placement and alignment prior to assembly. Machine vision is also used for quality assurance. For example, in the semiconductor device industry, images of chips are analyzed to insure that leads, solder paste and other components do not overrun designated boundaries.

As the machine vision industry has recognized, and consumers are soon to realize, one camera is often not enough. When machine vision is used in manufacturing, for example, it may be desirable to generate multiple simultaneous views of an object. Alternatively, it may be necessary to generate multiple views without moving the camera or the object. Within the consumer domain, web cams and Internet-based videoconferencing are among the applications which are likely to benefit from such uses of multiple cameras.

Notwithstanding the benefits of coupling computers to multiple cameras, no general purpose solutions exist. Some personal computers or workstations are equipped with only a single port capable of receiving high-speed video input streams. That port can be a universal serial bus (USB 2, hereinafter referred to, simply, as "USB") port, though, it may alternatively be an IEEE 1394-compatible ("FireWire") port. The machine vision industry relies on digital data processors with multiple video ports, however, these "vision processors" can represent an unnecessary expense in situations where the resources of a engineering workstation or personal computer are otherwise available.

In view of the foregoing, an object of this invention is to provide improved methods and apparatus for image acquisition.

A more particular object is to provide such methods and apparatus as permit multiple image acquisition devices to be coupled to a digital data processor.

A still more particular object is to provide such methods and apparatus as permit multiple image acquisition devices to be coupled to a personal computer, workstation or other digital data processor via a single port.

Still another object of the invention is to provide such methods and apparatus as support such coupling through a conventional high-speed serial port, such as a USB port, a FireWire port, or the like.

Still yet further objects of the invention are to provide such methods and apparatus as can be utilized with charge coupled device image acquisition devices.

Yet still further objects of the invention are to provide such methods and apparatus as permit the coupling of multiple video sources to a digital data processor, regardless of whether those sources are image acquisition devices.

SUMMARY OF THE INVENTION

These and other objects are met by the invention which provides, in one aspect, a hub that controls the acquisition of images from a plurality of image sources. Image acquisition logic operating within the hub selectively applies a first set of control signals (e.g., "shutter" signals) to the sources, causing them to acquire images. The logic applies a second set of control signals (e.g., "readout" signals) to the sources, causing them to output acquired images to the hub. The hub then transmits those images to a host over an isochronous communications medium, e.g., a USB or FireWire bus. As used herein, "isochronous" medium refers to a medium that permits creation of a connection (virtual or otherwise) between a source and a destination and that allows allocation of a minimum guaranteed bandwidth for transfer of information between such source and destination, regardless of the existence of other demands for bandwidth allocation or information transfer over that medium. Isochronous also refers to a medium that supports only isochronous transfers or, alternatively, to isochronous phases of a medium that supports isochronous and other types of transfers (e.g., asynchronous). An example of such an isochronous medium is a bus compatible with the aforementioned IEEE 1394 standard.

A hub or other image acquisition control apparatus as described above is advantageous, among other reasons, because it permits multiple image sources to be connected to a personal computer, work station or other host device via a single high-speed port, e.g., a FireWire port or a USB port.

Further aspects of the invention provide a hub (or other image acquisition control apparatus) as described above in which the image sources are cameras or other image acquisition devices and, more particularly, charge coupled device (CCD) image acquisition devices.

Related aspects of the invention provide such a hub for use with CCD or other image acquisition devices of the type that are responsive to a shutter signal for acquiring image data, and to a readout signal for outputting that data. The hub applies the first and second controls signals to such devices in such a way as to cause them to acquire or generate images substantially simultaneously, yet, output them sequentially (or with a desired degree of simultaneity) to the hub.

A hub as described above can operate utilizing instructions issued by the host, which can be for example a personal computer, workstation or other digital data processing device. Such a hub can, further, transfer image data received at its device interfaces substantially immediately to its host interface.

Still further aspects of the invention provide methods of operating hubs or image acquisition control apparatus paralleling the foregoing.

Hubs or image acquisition control apparatus and methods as described above provide numerous advantages in machine vision as well as in other industrial, research, home and recreational environments. Such apparatus and methods take advantage of the storage capabilities of CCD or other image capture devices, permitting multiple images to be acquired, e.g., simultaneously, while minimizing or virtually eliminating the need for buffering image data that are being transferred from the acquisition devices to the host.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
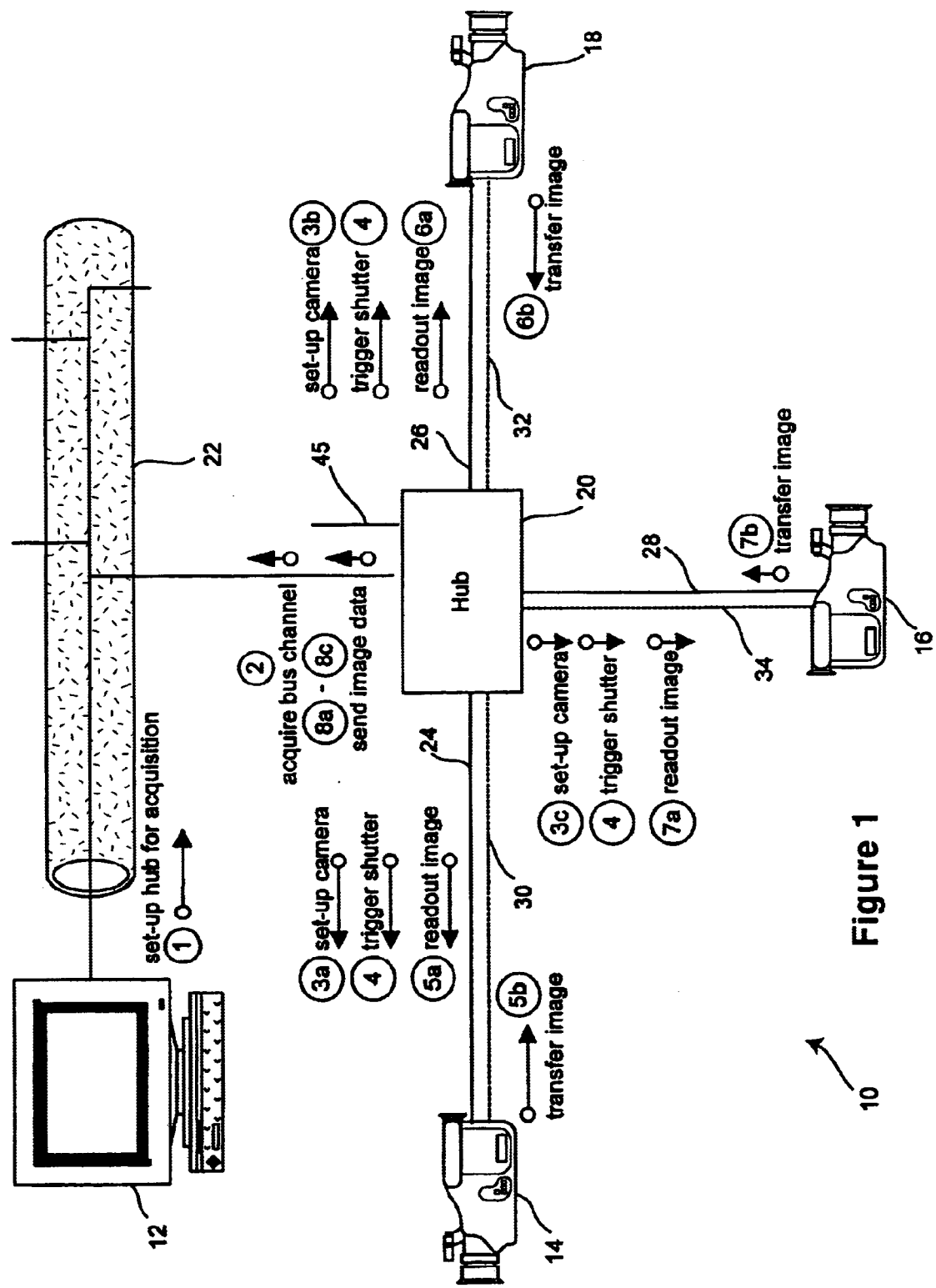
FIG. 1 depicts a system. according to the invention in which a host device is coupled to multiple image acquisition devices via a hub.

FIG. 1 depicts a system 10 according to the invention in which a host device 12 is coupled to multiple image acquisition devices 14, 16, 18 via a hub 20. The illustrated system 10 is configured for use in machine vision, though, related configurations and the teachings herein may be applied to any industrial, research, home, recreational or other application.

Host device 12 comprises a workstation, personal computer, digital data processor or other device equipped with a port (or other interface) for receiving image data transmitted over an isochronous communications medium 22. In the illustrated machine vision embodiment, host device 12 comprises an engineering workstation executing conventional machine vision software, as well as for exchanging data and control signals with hub 20 in accord with the teachings herein.

Communications medium 22 comprises any network, bus or other medium capable of effecting isochronous communications. In the illustrated embodiment, this is a FireWire bus—i.e., a bus compatible with the IEEE 1394 standard. Other embodiments operate medium 22 in accord with the universal serial bus (USB) standard, or in accord with other isochronous media standards.

Devices 14–18 comprise sources of image data. In the illustrated embodiment, these are image acquisition devices and, more particularly, charge coupled device (CCD) cameras constructed and operated in accord with the teachings of U.S. patent application Ser. Nos. 09/087,592 and 09/404,559, the teachings of which are incorporated herein by reference. The cameras taught in those applications permit image integration (herein referred to as "igeneration" or "acquisition") that is independent of readout. Thus, for example, they respond to applied shutter signals for acquiring images, and to applied readout signals for outputting those images, e.g., over lines 24–28. Devices 14–18 may comprise, alternatively or in addition, CMOS cameras or other image acquisition devices and video sources of the types available in the marketplace.

As noted, hub 20 is coupled to image acquisition devices 14–18 via lines 24–28. These may comprise any network, bus or other communications media (including, by non-limiting example, Ethernet, gigabit Ethernet, USB buses, FireWire buses, and so forth) capable of carrying image data from the devices 14–18 to the hub.

Hub 20 is also coupled to devices 14–18 via control lines 30–34. It may also be coupled to illumination sources, motion platforms and other auxiliary equipment (not shown) for facilitating image acquisition. In the illustrated embodiment, lines 30–34 are independent of lines 24–28 over which image data are carried. In any event, lines 30–34 are equipped to cary at least selected control signals, such as shutter signals, from the hub 20 to the devices 14–18 without substantial delay—thus, permitting the hub 20 to more accurately control the timing of image acquisition.

Figure 2:
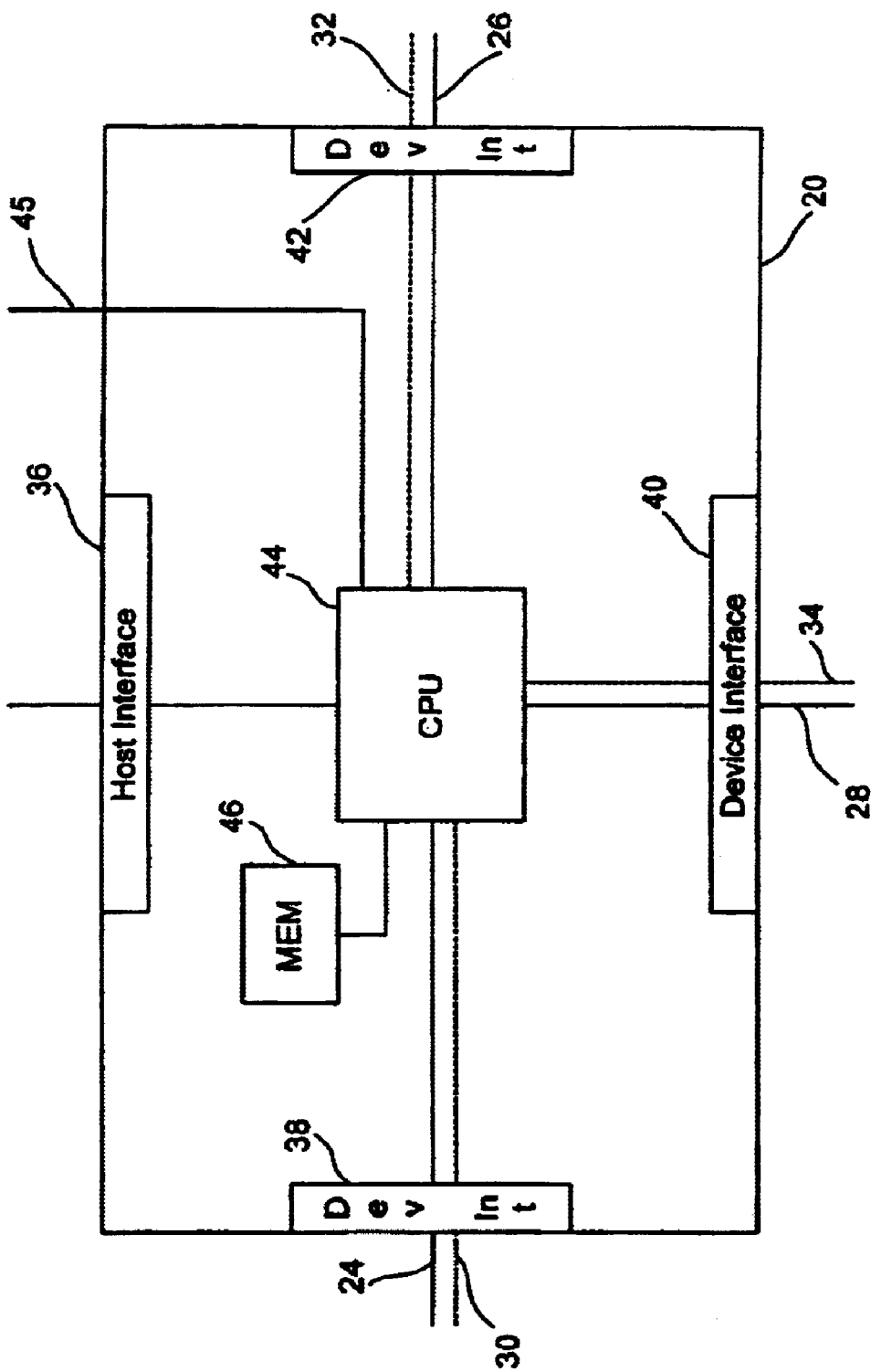
FIG. 2 depicts a hub according to the invention for use in a system of the type depicted in FIG. 1.

FIG. 2 depicts in greater detail a hub 20 according to the invention. The hub comprises a host interface 36 of conventional construction and operation that transmits data (including image data) and control signals to and from medium 22. Hub 20 likewise includes devices interfaces 38, 42, 44 that transmit image data and control signals to and from media 24–28, 30–34, as illustrated. Each interface 36–42 includes conductors, multiplexors, buffers and other circuitry (not shown) of the type known in the art for use in transferring data with the respective buses, networks, conductor sets or other media.

Hub 20 also include a central processing unit or other logic 44 (e.g., ASICs, gate arrays or the like) that controls the transfer of control and data signals over media 22–28, 30–34 based on instructions maintained in EEPROM, DRAM or other memory 46. Those instructions can be pre-stored in memory 46 (e.g., as in the case of EEPROM) and/or may be downloaded from host 12 via medium 22.

Regardless of the instruction source, logic 44 controls the acquisition (or generation) and readout of images by devices 14–18 in accord with the teachings below. This can be based, for example, on trigger events, e.g., received from an external source via external input line 45. In the illustrated embodiment, the logic 44 signals the devices 14–18 in such a manner as to cause them to acquire images, e.g., simultaneously, or as otherwise commanded by host 12, and to sequentially output their respective image data to the hub 20 for transfer to host 12 over medium 22. By sequencing the output of image data from the respective devices 14–18 and transferring that data substantially immediately from interfaces 38–42 to interface 36, the logic 44 minimizes or eliminates the need to buffer or otherwise store that data (e.g., in frame or FIFO memory) en route.

Referring again to FIG. 1, there is shown a sequence of steps executed by devices 12–20 to effect the control of image acquisition and transfer according to the invention.

In step 1, the host 12 transmits set-up instructions to the hub 20 for image acquisition. This includes specifying the acquisition devices 14–18 that will be used for image capture, as well as parameters necessary or desirable for such purposes. Examples include camera orientations (e.g., in the case of rotatable or positionable devices), trigger events, aperture settings, strobe settings, illumination levels and so forth. In a preferred embodiment, the host provides such instructions utilizing a protocol paralleling or identical to that under definition for the transfer of digital video data in connection with standard IEEE 1394. Although image data are transferred from hub 20 to host 12 using the isochronous phase of medium 22, instructions, control and other data can be sent during asynchronous or other phases.

In step 2, the hub 20 initiates the medium 22 for isochronous transfers and acquires a channel for transmission of image data thereon to the host 12. In the case of a FireWire medium, this is accomplished using conventional channel allocation techniques, e.g., involving the CHANNELS_AVAILABLE register and the BANDWIDTH_AVAILABLE register. The hub preferably allocates the channel(s) with sufficient capacity to accommodate the combined image data output by devices 14–18. Thus, for example, if each device 14–18 outputs image data at a rate of 1 MByte per frame and 50 milliseconds per frame, the hub 20 allocates 20 Mbytes per second of isochronous channel capacity on medium 22 to accommodate the combined output of those three devices 14–18. In this example, the latency between a trigger event requesting simultaneous acquisition and the completion of three acquisitions would be 150 milliseconds.

In steps 3a–3c, the hub 20 sets up each image acquisition device. This is accomplished by sending control signals to each device 14–18 along control lines 30–34 and/or data lines 24–28 utilizing parameters defined by host 12 in step 1, as well as any other parameters desirable or necessary to condition the devices 14–18 for image acquisition. As noted above, these can include orientation, aperture, strobe, illumination, and so forth.

In step 4, the hub applies shutter signals to the respective device interfaces 38–42 (via lines 30–34), causing the devices 14–18 to acquire images. Application of the shutter signals can be keyed to a clock or other event, e.g., in accord with instructions sent from the host 12 to hub 20 in step 1. In the illustrated embodiment, the shutter signals are applied substantially simultaneously to the devices 14–18, thereby, causing them to acquire images substantially simultaneously. Of course, the hub 20 can apply shutter signals at different times to effect other image acquisition timings, as well, e.g., in accord with instructions from host 12.

In step 5a, the hub applies a readout signal to the interface 38, causing associated image acquisition device 14 to output image data previously acquired by it. The readout signal can be transmitted along control lines 30 or along data lines 24. Image data output by device is returned along line 24. See step 5b. Similar sequences are executed with respect to devices 16–18. See steps 6a–6b and 7a–7b.

As image data output by devices 14–18 is received by hub 20, the hub transmits that along medium 22 to host 12. In the illustrated embodiment, the hub transfers each pixel of image data received at an interface 38–42 directly to interface 36, with only such buffering as is required to construct packets or other structures necessitated by the protocol of medium 22. To this end, logic 44 preferably times steps 5–7 for accord with the allocated isochronous channel on medium 22, insuring that the channel will be ready to accept image data as it becomes available from the devices 14–18. Logic 44 also sequences the individual readout signals applied in steps 5a, 6a and 7a, respectively, to minimize any undesired overlap in receipt of image data from the respective devices 14–18, thereby, further minimizing or eliminating a need for buffering that data. In alternate embodiments, the hub 20 buffers data received from the devices 14–18 prior to transmitting it to the host.

Described above are methods and apparatus meeting the desired objectives. Those skilled in the art will appreciate that the embodiments shown in the drawings and discussed herein are examples of the invention, and that other embodiments incorporating changes thereto fall within the scope of the invention. Thus, by way of non-limiting example, it will be appreciated that medium 22 can support isochronous protocols other than those defined under the IEEE 1394 or USB standards. By way of further example, it will be appreciated that the hub can be used to control the transfer of video data other than that generated by image acquisition devices. By way of still further example, it will be appreciated that CMOS or other solid state cameras or image acquisition devices may be substituted for the charge coupled devices (CCDs) referred to above.

In view of the foregoing, what I claim is:

1. A hub for controlling acquisition of images from a plural of sensors, the hub comprising:

a plurality of device interfaces, each of which exchanges information with an associated one of the plural sensors, each of the plural sensors being responsive to an applied shutter signal to acquire a frame of image data and being responsive to an applied readout signal to initiate output of that frame of image data, wherein the sensor does not acquire a new frame of image data prior to output of a previously acquired frame of image data, a host interface that exchanges information with a host over an isochronous communications medium, image acquisition logic, coupled to the device interfaces and to the host interface, the image acquisition logic (i) selectively applying shutter signals to the device interfaces to cause the associated sensors to acquire image data, (ii) selectively applying readout signals the device interfaces to cause the associated sensors to output image data acquired by them, (iii) transferring image data received at the device interface to the host interface for output to the host over the communications medium, the image acquisition logic applying (i) shutter signals to the device interfaces so as to cause the associated sensors to acquire image data substantially simultaneously with respect to one another, (ii) readout signals to the device interfaces so as to cause the associated sensors to output the acquired image data in a sequence with respect to one another, wherein the image acquisition logic transfers substantially immediately to the host interface image data at a said device interface, and wherein the image acquisition logic buffers substantially no more image data than required to construct data packets from data received at a said device interface prior to output to the host interface.

2. A hub according to claim 1 that operates in accord with instructions from the host.

3. Control apparatus for controlling acquisition of images from a plurality of image acquisition devices, the control apparatus comprising:

at least one device interface that transfers information between the control apparatus and the plurality of image acquisition devices, each of the plural image acquisition devices being responsive to an applied shutter signal to acquire a frame of image data and being responsive to an applied readout signal to initiate output of that frame of image data, wherein the image acquisition device does not acquire a new frame of image data prior to output of a previously acquired frame of image data, a host interface that transfers information between the control apparatus and a host over an isochronous communications medium, image acquisition logic, coupled to at least one device interface and to the host interface, the image acquisition logic (i) selectively applying shutter signals to the at least one device interface to cause each of the plurality of image acquisition devices to acquire image data, (ii) selectively applying readout signals to the at least one device interface to cause each of the plurality of image acquisition devices to output image data acquired by them, (iii) transferring image data output by the image acquisition devices to the host over the communications medium, the image acquisition logic applying (i) shutter signals to the at least one device interface so as to cause the associated image acquisition devices to acquire image data substantially simultaneously with respect to one another, (ii) readout signals to the at least one device interface so as to cause the associated image acquisition devices to output the acquired image data independently with respect to one another wherein the image acquisition logic transfers substantially immediately to the host interface image data at a said device interface, and wherein the image acquisition logic buffers substantially no more image data than required to construct data packets from data received at a said device interface prior to output to the host interface.

4. Control apparatus according to claim 3, wherein the image acquisition logic applies the shutter and readout signals to the at least one device interface so as to effect sequential transfer to the host of image data captured substantially simultaneously by the image acquisition devices.

5. Control apparatus according to claim 4, wherein the image acquisition logic applies the shutter signals to the at least one device interface to cause the plurality of image acquisition devices to acquire image data substantially simultaneously with respect to one another and wherein the image acquisition logic applies the readout signals to to the at least one device interface to cause the plurality of image acquisition devices to output image data acquired by them in a selected sequence.

6. A hub for controlling acquisition of images from a plurality of image acquisition devices, the hub comprising:

a plurality of device interfaces, each of which exchanges information with an associated one of the plural image acquisition devices, each of the plural image acquisition devices being responsive to an applied shutter signal to acquire a frame of image data and being responsive to an applied readout signal to initiate output of that frame of image data, wherein each image acquisition devices does not acquire a new frame of image data prior to output of a previously acquired frame of image data, a host interface that exchanges information with a host over a communications medium that supports information transfers in accord with an IEEE 1394 standard, image acquisition logic, coupled to the device interfaces and to the host interface, the image acquisition logic (i) selectively applying shutter signals to the device interfaces to cause the associated image acquisition devices to acquire image data, (ii) selectively applying readout signals the device interfaces to cause the image acquisition devices to output image data acquired by them, (iii) transferring image data received at the device interfaces to the host interface for output to the host over the communications medium, the image acquisition logic applying (i) shutter signals to the device interfaces so as to cause the associated image acquisition devices to acquire image data substantially simultaneously with respect to one another, (ii) readout signals to the device interfaces so as to cause the associated image acquisition devices to output the acquired image data in a sequence with respect to one another, wherein the image acquisition logic outputs image data received at a device interface substantially immediately via the host interface, and wherein the image acquisition logic buffers substantially no more image data than required to construct data packets from data received at a said device interface prior to output to the host interface.

7. A hub according to claim 6 that operates in accord with instructions from the host.

8. Control apparatus for controlling acquisition of images from a plurality of image sources, the control apparatus comprising:

a plurality of device interfaces, each of which exchanges information with an associated one of the plural image sources, each of the plural image sources being responsive to an applied shutter signal to acquire a frame of image data and being responsive to an applied readout signal to initiate output of that frame of image data, wherein each image source does not acquire a new frame of image data prior to output of a previously acquired frame of image data, each device interface including a control line for transferring a shutter signal from the apparatus to the associated image source to cause it to capture an image, a host interface that exchanges information with a host over an isochronous communications medium, image acquisition logic, coupled to the device interfaces and to the host interface, the image acquisition logic (i) selectively applying shutter signals to the control lines to cause the associated image sources to acquire image data, (ii) selectively applying readout signals the device interfaces to cause the image sources to output image data acquired by them, (iii) transferring image data received at the device interfaces to the host interface for output to the host over the communications medium, the image acquisition logic applying (i) shutter signals to the control lines so as to cause the associated image sources to acquire image data substantially simultaneously with respect to one another, (ii) readout signals to the device interfaces so as to cause the associated image sources to output the acquired image data independently with respect to one another, wherein the image acquisition logic transfers substantially immediately to the host interface image data at the device interfaces, and wherein the image acquisition logic buffers substantially no image data received at a said device interface prior to output to the host interface.

9. Control apparatus according to claim 8, wherein each control line is arranged for transferring an applied shutter signal to the associated image source substantially without delay.

10. Control apparatus according to claim 9, wherein the control line comprises a communications medium independent of that over which the image data is transferred by the associated device interface.

11. Control apparatus according to claim 10, wherein each device interface transfers the shutter signal to the associated image source over a line independent of the line over which image data is transferred by the associated device interface.

12. Control apparatus according to claim 8, wherein the image acquisition logic acquires bandwidth on the communications medium.

13. Control apparatus according to claim 8, wherein the image acquisition logic applies the shutter and readout signals to the plurality of image sources so as to effect sequential transfer to the host of images captured substantially simultaneously by the image sources.

14. Control apparatus according to claim 13, wherein the image acquisition logic applies the shutter signals substantially simultaneously to the plurality of image sources and wherein the image acquisition logic applies the readout signals to those devices in a selected sequence.

15. Control apparatus according to claim 8 that operates in accord with instructions from the host.

16. Control apparatus according to claim 8, wherein the host interface transfers information with a communications medium that supports information transfers in accord with an IEEE 1394 standard.

17. Control apparatus according to claim 9, wherein the host interface transfers information with a communications medium that supports information transfers in accord with a Universal Serial Bus (USB) standard.

18. A method for controlling acquisition of images from a plurality of image acquisition devices, the method comprising:
   A. providing a hub including
      a plurality of device interfaces, each of which exchanges information with an associated one of the plural image acquisition devices, each of the plural image acquisition devices being responsive to an applied shutter signal to acquire a frame of image data and being responsive to an applied readout signal to initiate output of that frame of image data, wherein each image acquisition device does not acquire a new frame of image data prior to output of a previously acquired frame of image data,
      a host interface that exchanges information with a host over an isochronous communications medium,
   B. selectively applying shutter signals to the device interfaces to cause the associated image acquisition devices to acquire image data,
   C. selectively applying readout signals the device interfaces to cause the image acquisition devices to output image data acquired by them,
   D. transferring image data received at the device interfaces to the host interface for output to the host over the communications medium
   E. performing steps B and C so as (i) to cause the image acquisition devices to acquire image data substantially simultaneously with respect to one another, (ii) to cause the associated image acquisition devices to output the acquired image data in a sequence with respect to one another,
   F. performing step D so as to transferred image data at a said device interface substantially immediately to the host interface, and buffering substantially no more image data than required to construct data packets from data received at a said device interface prior to output to the host interface.

19. A method according to claim 18, comprising executing steps (B) and (D) in accord with instructions from the host.

20. A method for controlling acquisition of images from a plurality of image sources, the method comprising:
   A. providing a control device having
      at least one device interface that transfers information between the control device and the plurality of image sources, each of the plural image sources being responsive to an applied shutter signal to acquire a frame of image data and being responsive to an applied readout signal to initiate output of that frame of image data, wherein each image source does not acquire a new frame of image data prior to output of a previously acquired frame of image data,
      a host interface that transfers information between the control device and a host over an isochronous communications medium,
   B. selectively applying shutter signals to the image sources to cause each of them to acquire image data,
   C. selectively applying readout signals to the image sources to cause each of them to output, for tansfer to the control device, the image data captured by that image acquisition device,
   D. transferring image data output by the image sources to the host over the communications medium,
   E. performing steps B and C so as (i) to cause the image acquisition devices to acquire image data substantially simultaneously with respect to one another, (ii) to cause the associated image acquisition devices to output the acquired image data independently with respect to one another,
   F. performing step D so as to transferred image data at a said device interface substantially immediately to the host interface, and buffering substantially no more image data than required to construct data packets from data received at a said device interface prior to output to the host interface.

21. A method according to claim 20, comprising applying the shutter and readout signals to the plurality of image sources so as to effect sequential transfer to the host of images captured substantially simultaneously by the image acquisition devices.

22. A method according to claim 21, comprising applying the shutter signals substantially simultaneously to the plurality of image sources and comprising applying the readout signals to those devices in a selected sequence.

23. A method for controlling acquisition of images from a plurality of image acquisition devices, the method comprising:
   A. providing a hub including
      a plurality of device interfaces, each of which exchanges information with an associated one of the plural image acquisition devices, each of the plural image acquisition devices being responsive to an applied shutter signal to acquire a frame of image data and being responsive to an applied readout signal to initiate output of that frame of image data, wherein each image source does not acquire a new frame of image data prior to output of a previously acquired frame of image data,
      a host interface that exchanges information with a host over a communications medium that supports information transfers in accord with an IEEE 1394 standard,
   B. selectively applying shutter signals to the device interfaces to cause the associated image acquisition devices to acquire image data,
   C. selectively applying readout signals the device interfaces to cause the image acquisition devices to output image data acquired by them,
   D. transferring image data received at the device interfaces to the host interface for output to the host over the communications medium,
   E. performing steps B and C so as (i) to cause the image acquisition devices to acquire image data substantially simultaneously with respect to one another, (ii) to cause the associated image acquisition devices to output the acquired image data in a sequence with respect to one another
   F. performing step D so as to transferred image data at a said device interface substantially immediately to the host interface, and buffering substantially no more image data than required to construct data packets from data received at a said device interface prior to output to the host interface.

24. A method according to claim 23 comprising operating in accord with instructions from the host.

25. A method according to claim 23, comprising applying shutter and readout signals to the device interfaces to effect sequential output of image data by the plural image acquisition devices of images acquired substantially simultaneously by them.

26. A hug according to claim 25, comprising applying the shutter signal substantially simultaneously to the plurality of image acquisition devices and comprising applying the readout signals to those devices in a selected sequence.

27. A method for controlling acquisition of images from a plurality of image sources, the method comprising:
   A. providing a control apparatus including
      a plurality of device interfaces, each of which exchanges information with an associated one of the plural image sources, each of the plural image sources being responsive to an applied shutter signal to acquire a frame of image data and being responsive to an applied readout signal to initiate output of that frame of image data, wherein each image source does not acquire a new frame of image data prior to output of a previously acquired frame of image data,
      each device interface including a control line for transferring a shutter signal from the apparatus to the associated image source to cause it to capture an image,
      a host interface that exchanges information with a host over an isochonous communications medium,
   B. selectively applying shutter signals to the control lines to cause the associated image sources to acquire image data,
   C. selectively applying readout signals the device interfaces to cause the image sources to output image data acquired by them,
   D. transferring image data received at the device interfaces to the host interface for output to the host over the communications medium,
   E. performing steps B and C so as (i) to cause the image acquisition devices to acquire image data substantially simultaneously with respect to one another, (ii) to cause the associated image acquisition devices to output the acquired image data in a sequence with respect to one another
   F. performing step D so as to transferred image data at a said device interface substantially immediately to the host interface, and buffering substantially no more image data than required to construct data packets from data received at a said device interface prior to output to the host interface.

28. A method according to claim 27, comprising transferring an applied shutter signal over a control line to the associated device substantially without delay.

29. A method according to claim 28, wherein the control line comprises a communications medium independent of that over which the image data is transferred by the associated device interface.

30. A method according to claim 29, comprising transferring the shutter signal to the associated image acquisition apparatus over a line independent of the line over which image data is transferred by the associated device interface.

31. A method according to claim 27, comprising acquiring bandwidth on the communications medium.

32. A method according to claim 27, comprising applying the first and readout signals to the plurality of image sources so as to effect sequential transfer to the host of images captured substantially simultaneously by the image acquisition devices.

33. A method according to claim 32, comprising applying the shutter signals substantially simultaneously to the plurality of image sources and comprising applying the readout signals to those devices in a selected sequence.

34. A method according to claim 27 comprising operating in accord with instructions from the host.

35. A method according to claim 27, comprising transferring image data at a said device interface substantially immediately to the host interface.

36. A method according to claim 35, comprising buffering substantially no image data received at a said device interface prior to output to the host interface.

37. A method according to claim 27, comprising transferring information over the host interface in accord with an IEEE 1394 standard.

38. A method according to claim 28, comprising transferring information over the host interface in accord with a Universal Serial Bus (USB) standard.

* * * * *